United States Patent
Clark et al.

(10) Patent No.: US 8,365,008 B2
(45) Date of Patent: Jan. 29, 2013

(54) PROVIDING UNSOLICITED GLOBAL DISCONNECT REQUESTS TO USERS OF STORAGE

(75) Inventors: Brian D. Clark, Tucson, AZ (US); Juan A. Coronado, Tucson, AZ (US); Christopher D. Filachek, Lagrangeville, NY (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/903,623

(22) Filed: Oct. 13, 2010

(65) Prior Publication Data

US 2012/0096304 A1    Apr. 19, 2012

(51) Int. Cl.
*G06F 11/00* (2006.01)
(52) U.S. Cl. ...................................... 714/4.1
(58) Field of Classification Search ............ 714/4.1, 714/4.2, 4.21, 4.3, 4.4, 6.12, 6.23, 6.24, 6.3, 714/6.31, 6.32, 11–13, 20, 42, 54
See application file for complete search history.

(56) References Cited

U.S. PATENT DOCUMENTS

| | | | | |
|---|---|---|---|---|
| 5,875,485 A * | 2/1999 | Matsumoto | ................... | 711/152 |
| 6,151,688 A * | 11/2000 | Wipfel et al. | ................... | 714/48 |
| 6,338,112 B1 * | 1/2002 | Wipfel et al. | ................. | 710/269 |
| 6,539,446 B1 | 3/2003 | Chan | | |
| 6,681,339 B2 | 1/2004 | McKean et al. | | |
| 7,496,701 B2 * | 2/2009 | Crawford et al. | ............... | 710/62 |
| 8,266,474 B2 * | 9/2012 | Goel | .............................. | 714/4.2 |
| 2001/0014954 A1 | 8/2001 | Purcell et al. | | |
| 2005/0246570 A1 * | 11/2005 | Block et al. | ........................ | 714/4 |
| 2007/0180287 A1 * | 8/2007 | Kumar et al. | ...................... | 714/4 |
| 2009/0006602 A1 | 1/2009 | Takeuchi et al. | | |

* cited by examiner

*Primary Examiner* — Nadeem Iqbal
(74) *Attorney, Agent, or Firm* — Stephen R. Tkacs; Stephen J. Walder, Jr.; Feb R. Cabrasawan

(57) ABSTRACT

A mechanism is provided in a storage control unit in a data processing system for providing unsolicited global disconnect requests to users. The mechanism stores lock control data in the storage control unit. The storage control unit allocates its resources into a plurality of clusters. Responsive to a given user connecting to a given partition that is for a logical subsystem resident on a first cluster within the plurality of clusters, the mechanism sends reflected partition information from the first cluster to a second cluster within the plurality of clusters. Responsive to the first cluster experiencing a failure condition, the mechanism moves control data from one or more logical subsystems from the first cluster to the second cluster and for each logical subsystem that moved from the first logical subsystem to the second logical subsystem and that has reflected partition information, presents unsolicited status to one or more users.

20 Claims, 4 Drawing Sheets

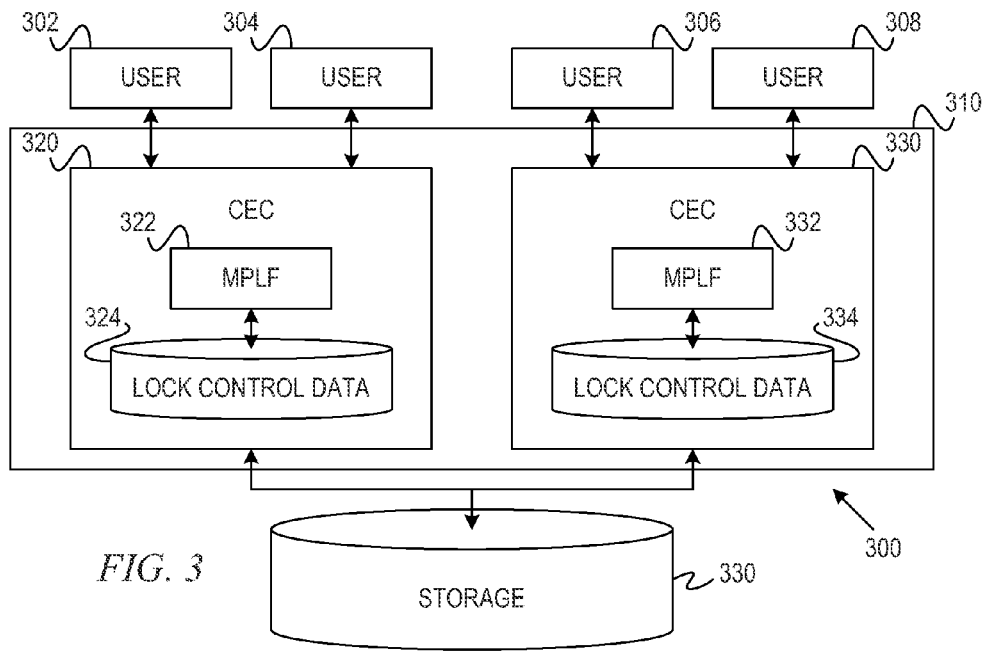

| CEC 0 | CEC 1 |
|---|---|
| BASIC CONNECT TO LSS 0, PARTITION 0, USER 0. THIS INITIALIZED THE PARTITION/USER ENTRY INFORMATION ON CEC 0. A CROSS-CLUSTER MESSAGE IS SENT TO CEC 1 TO ALLOW IT TO REFLECT THAT THIS USER IS ACTIVE. | |
| | MESSAGE FROM CEC 0, CAUSES CEC 1 TO SET A 'REFLECTED' INDICATOR THAT LSS 0, PARTITION 0, USER 0 IS ACTIVE |
| FAILOVER CAUSES LSS 0 TO MOVE TO CEC 1 | |
| | ANY MPLF COMMANDS FOR LSS 0, PARTITION 0, USER 0 WILL SEE THE INDICATOR THAT THIS USER WAS ACTIVE ON THE OTHER SIDE AND THERE IS CLEAN UP TO BE DONE. GLOBAL DISCONNECT REQUIRED (0xF1) WILL BE RETURNED TO TPF |

FIG. 5

| BYTE | DESCRIPTION |
|---|---|
| 00-01 | LENGTH = x'001A' |
| 02 | FORMAT = x'04' |
| 03 | MESSAGE TYPE = x'05' GLOBAL DISCONNECT REQUESTED |
| 04-08 | UNUSED |
| 09 | REASON CODE (EXISTING 0xF1 -- CACHE STORAGE WAS REINITIALIZED SINCE THE CONNECT ORDER WAS EXECUTED...; NEW 0xF2 PARTITION/LOCK/ ATTENTIONS STRUCTURES INCONGRUENT DURING WARMSTART; ETC.) |
| 10-17 | UNUSED |
| 18 | UNUSED |
| 19 | THE MULTI-PATH LOCK PARTITION |
| 20-22 | THE MULTI-PATH USER TOKEN RETURNED IN THE CONNECT ORDER RESPONSE |
| 23 | UNUSED |
| 24 | UNUSED |
| 25 | UNUSED |

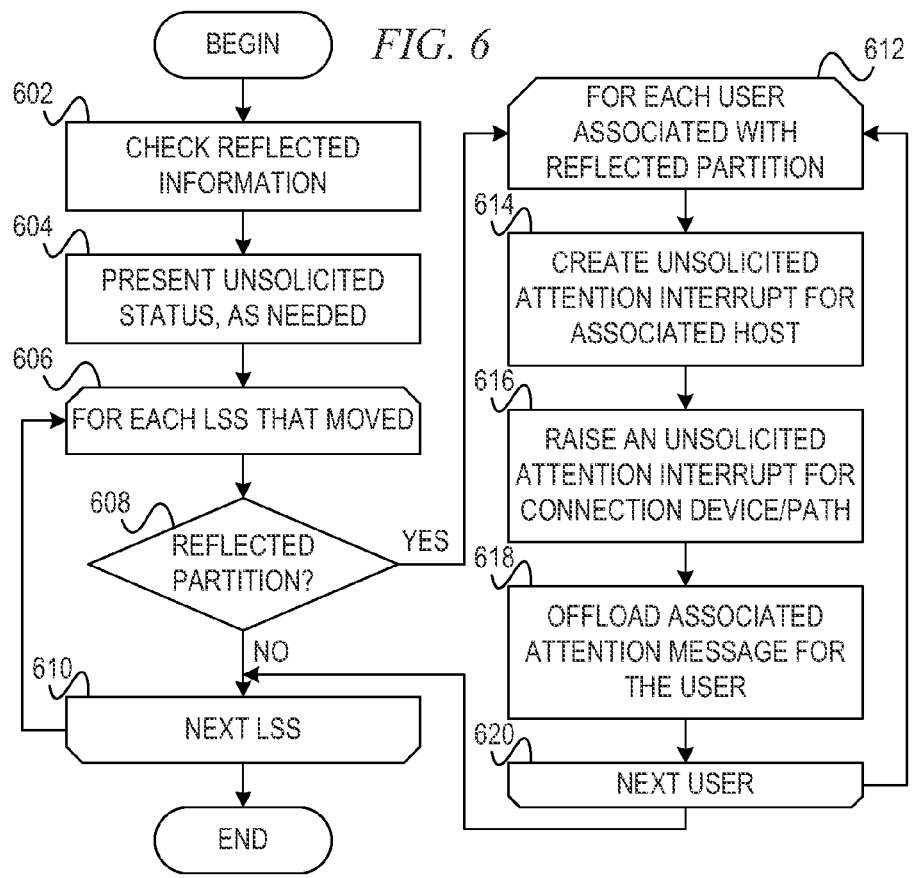

FIG. 6

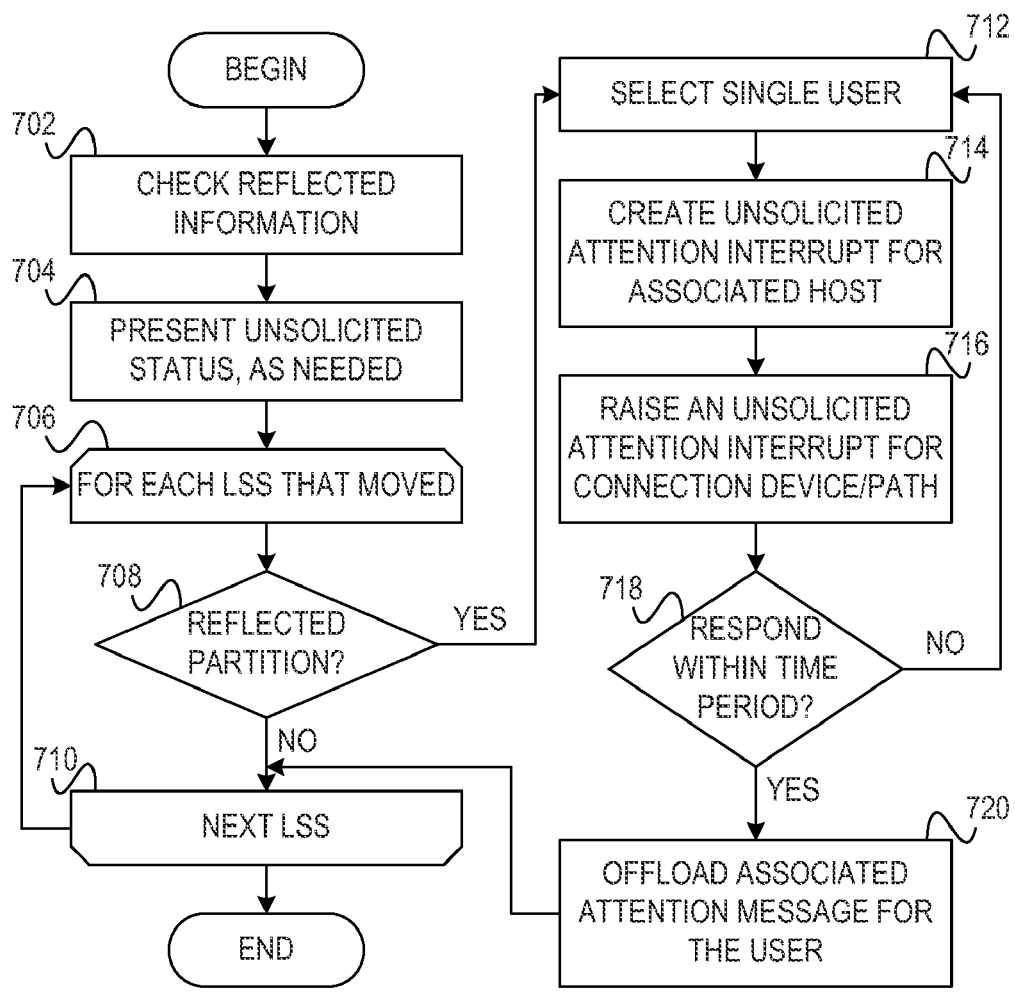

PROVIDING UNSOLICITED GLOBAL DISCONNECT REQUESTS TO USERS OF STORAGE

BACKGROUND

In transaction processing facilities, such as reservation systems or financial systems, one or more hosts connect to storage through a storage control unit that serves as a repository for lock control data. The storage control unit may allocate resources into clusters. When a failure occurs, the storage control unit may perform a failover operation from one cluster to another. When such a failure occurs and an application on a host attempts to access storage, the storage control unit returns an indicator that a global disconnect is required to notify the application that the application must disconnect, reconnect, and rebuild its locks. In response to such an indicator, the application performs the disconnect, reconnect, and rebuild operations to effect the failover operation.

SUMMARY

In one illustrative embodiment, a method is provided in a storage control unit in a data processing system for providing unsolicited global disconnect requests to users. The method comprises storing lock control data in the storage control unit. The storage control unit allocates its resources into a plurality of clusters. The lock control data contains knowledge about locks, logical subsystems, partitions, and users of the partitions. The method further comprises responsive to a given user connecting to a given partition that is for a logical subsystem resident on a first cluster within the plurality of clusters, sending reflected partition information from the first cluster to a second cluster within the plurality of clusters. The reflected partition information identifies one or more logical subsystems, partitions, and connected users. The method further comprises responsive to, the first cluster experiencing a failure condition, moving control data from one or more logical subsystems from the first cluster to the second cluster, storing the control data for the one or more logical subsystems in association with the second cluster, and for each logical subsystem that moved from the first logical subsystem to the second logical subsystem and that has reflected partition information, presenting unsolicited status to one or more users. The unsolicited status comprises a global disconnect requested message. At least one user within the one or more users reads the unsolicited status.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating a data processing system with multiple cluster storage control unit in accordance with an illustrative embodiment;

FIG. 4 is a flow diagram illustrating failover between two clusters in accordance with an illustrative embodiment;

FIG. 5 illustrates an unsolicited attention message requesting global disconnect in accordance with an illustrative embodiment;

FIG. 6 is a flowchart illustrating operation of a storage control unit providing unsolicited global disconnect requests to software in accordance with an illustrative embodiment; and FIG. 7 is a flowchart illustrating operation of a storage control unit providing unsolicited global disconnect requests to software in accordance with an alternative embodiment.

DETAILED DESCRIPTION

Figure 1:
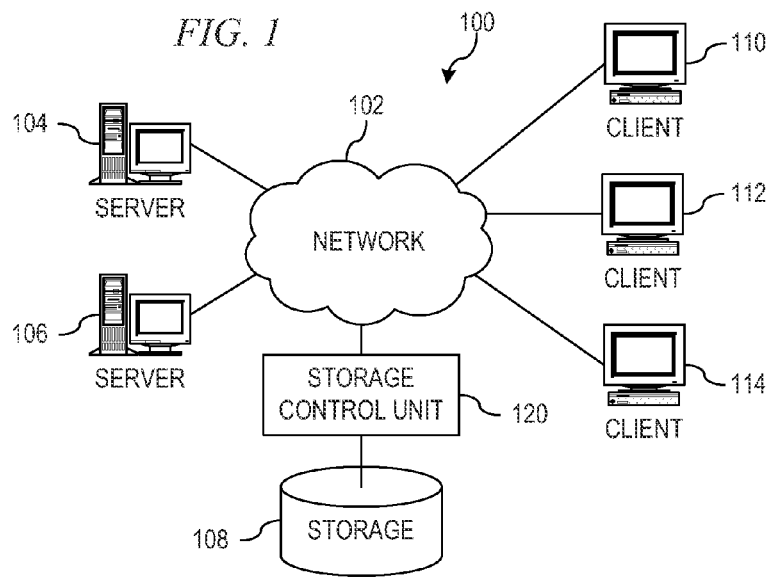
FIG. 1 depicts a pictorial representation of an example distributed data processing system in which aspects of the illustrative embodiments may be implemented.

The illustrative embodiments provide a mechanism for providing unsolicited global disconnect requests to software. When a failure occurs in a storage control unit, the storage control unit sends an unsolicited status message to affected host applications indicating that a global disconnect operation is required. The host applications receive the unsolicited status message indicating that a global disconnect is required without performing a polling operation, thus reducing the likelihood that further failures may occur before a host application performs operations to rebuild its locks.

The transaction processing facility (TPF) operating system is used in reservation and financial systems requiring high I/O throughput and strict data locking controls. Storage control units that attach to this operating system function as the repository for the lock control data. This locking architecture is known as multi-path lock facility (MPLF). The lock control data contains knowledge about the locks, lock partitions, and users of the partitions.

In the loosely coupled TPF environment, where multiple hosts can run read and write operations to the same devices, TPF controls access to individual records through the use of logical locks. The management of the locks is controlled at the host (TPF) level using a set of perform system function (PSF) commands, the MPLF commands, and the corresponding MPLF attentions built by the storage control unit to tell the host when work is done asynchronously. These MPLF attentions are used to tell the host when there is contention for a particular lock it holds and more importantly when a host has been granted a lock for which it was waiting.

When TPF initially starts using a storage control unit, it defines partitions to control its lock space. Each host who wants to run transactions on a particular logical subsystem and partition connects to that partition. In the connection command, they specify a unique connection device and path. When a host first connects to a partition, the device and path used to issue the command is characterized as the connection device and connection path. Unique MPLF attentions are presented to that host only via the corresponding connection device and path. This connection device and path are used to control the presentation of attentions.

The storage control units may allocate their resources (CPU, memory, etc.) into clusters, referred to as computer electronic complexes (CECs). Each CEC has knowledge of logical subsystems (LSSs). In the event of a failover, the failing CEC's lock control data is lost. The storage control unit fails over the logical subsystems and their devices from one CEC to the other. Access to said devices is then handled through the new CEC.

In accordance with the illustrative embodiments, when a storage control unit fails over, the storage control unit scans through its list of reflected partition indicators for the logical storage systems that moved. If the storage control unit sees an indication that the partition had been active when the LSS was on the other CEC, the storage controller gives unsolicited status to the host via a multi-path lock facility attention interrupt. The host responds by performing a read message operation to the storage control unit to read the unsolicited status. The read message returns the new global disconnect required (GDR) message. The host responds to this new message by initiating a global disconnect and reconnect and lock rebuild operations. In addition to giving this unsolicited status on GDR issues for failover, if the storage control unit requires the host to rebuild its locks for other reasons that result in partitions being marked as global disconnect required, this mechanism may also be used for this purpose.

Figure 2:
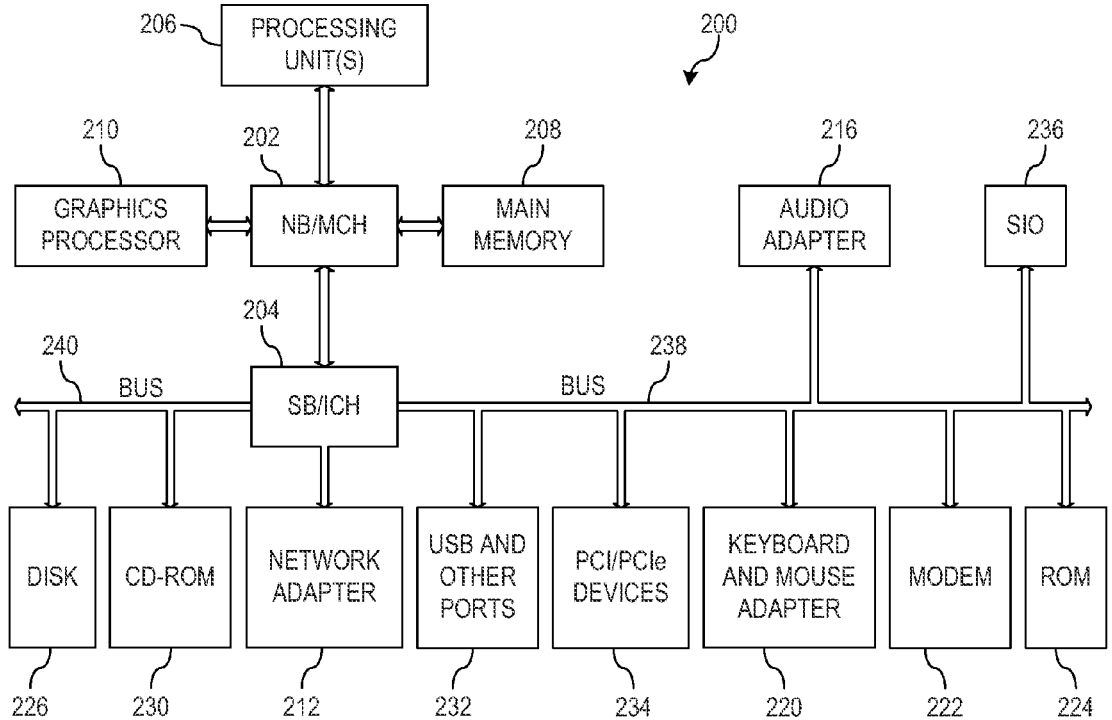
FIG. 2 is a block diagram of an example data processing system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 may provide data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In accordance with an illustrative embodiment, data processing system 100 comprises storage control unit 120, which provides access to storage 108. Servers 104 and 106 may run a transaction processing facility (TPF) operating system, which is often used in reservation and financial systems requiring high I/O throughput and strict data locking controls. Storage control unit 120 attaches to servers 104 and 106 as the repository for the lock control data. The locking architecture is referred to as multi-path lock facility (MPLF). The lock control data contains knowledge about the locks, lock partitions, and users of the partitions.

The MPLF structure divides the lock control data into logical subsystems (LSS), which may contain a plurality of partitions. For example, a LSS may have eight partitions, and each partition may have a number of users.

With reference now to FIG. 2, a block diagram of an example data processing system is shown in which aspects of the illustrative embodiments may be implemented. Data processing system 200 is an example of a computer, such as client 110, server 104, or storage control unit 120 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (S1O) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a block diagram illustrating a data processing system with multiple cluster storage control unit in accordance with an illustrative embodiment. Data processing system 300 comprises users 302, 304, 306, 308 that access data in storage 330 via storage control unit 310. Users 302, 304, 306, 308 may be host systems, such as servers 104, 106 in FIG. 1, for example.

Storage control unit 310 may allocate its resources, such as CPU, memory, etc., into clusters 320, 330, which are also referred to as CECs. CEC 320 has multi-path lock facility (MPLF) 322, which maintains lock control data 324. CEC 330 has MPLF 332, which maintains lock control data 334. Lock control data 324 and 334 contains knowledge of the logical subsystems. The loss of one CEC due to hardware or software error, for example, may be referred to as a "failover," as the surviving CEC takes control of the failing CEC's logical subsystems.

When a user connects on CEC 320 to a partition that is for a logical subsystem (LSS) resident on that CEC, CEC 320 sends a message to CEC 330 to set an indication that there is an active user for this particular LSS. This reflected information allows storage control unit 310 to detect when a failover has occurred for the LSS. In the event of a failover where the LSS moves, the control unit tells the TPF that a global disconnect is required (GDR 0xF1) for the associated partitions and does so on the next MPLF type I/O executed for this LSS/partition.

FIG. 4 is a flow diagram illustrating failover between two clusters in accordance with an illustrative embodiment. Cluster, CEC 0, establishes a basic connect to logical subsystem (LSS) 0, partition 0, for user 0. This connection initializes the partition/user entry information on CEC 0. CEC 0 sends a cross-cluster message to CEC 1 to allow CEC 1 to reflect that this user is active. CEC 1 receives the message from CEC 0, which causes CEC 1 to set a "reflected" indicator that LSS 0, partition 0, user 0 is active.

A failover at CEC 0 causes LSS 0 to move to CEC 1. At CEC 1, any MPLF commands for LSS 0, partition 0, user 0 will result in CEC 1 seeing that this user was active on the other CEC and that clean up is necessary. CEC 1 returns a global disconnect required message (0xF1) to the host system.

Had there been a failback where the LSS moved from CEC 1 to CEC 0, the storage control unit, such as storage control unit 310 in FIG. 3, would have been able to move the special indicator as well. Had a secondary failure occurred such that a reboot was required before the host system drove an appropriate I/O to detect the global disconnect required condition, then the host will see that it no longer has a partition connected on the LSS of interest. Had the host driven the appropriate I/O after the LSS moved originally, then the host would have seen the 0xF1 return code.

It is problematic for a host system to see no partition active when it expects a partition to be active. However, if the host is not running I/O to the connected device, then the host is not aware when a failover has occurred and the storage control unit requires the host to rebuild its locks. If a second failure occurs, the host will not get the correct indication because the control unit is not capable of retaining that information. When the host is told that a user is not connected unexpectedly, it is a highly unusual case and only expected when a host system is purposefully lock fenced through an explicit user command. The host does not expect to be running in a good steady state condition and then have the storage control unit respond that it is unaware of the user. This causes the host to go into a catastrophic failure mode, resulting in the need to reinitialize and reload code for the system.

The z/TPF operating system from IBM Corporation has a polling mechanism to poll once a minute for each LSS. The operating system issues a purge lock command for an unused lock name to flush out any global disconnect required MPLF return codes. This is a mechanism used for logical subsystems that have little or no locking activity. However, if certain failures occur in a storage control unit, the operating system could still get the global disconnect required indication and take the wrong recovery actions.

Returning to FIG. 3, in accordance with an illustrative embodiment, when storage control unit 310 fails over, storage control unit 310 scans through its list of "reflected partition" indicators for the logical subsystems (LSS) that moved. If storage control unit 310 sees an indication that the partition had been active when the LSS was on the other CEC, storage control unit 310 gives unsolicited status (multi-path lock facility (MPLF) attention interrupt) to the host.

The host, user 302 or user 304, responds by performing a read message operation to storage control unit 310 to read the unsolicited status. The read message returns a new global disconnect required (GDR) message. The host responds to this new message by initiating a global disconnect and reconnect/lock rebuild operation. In addition to giving this unsolicited status on GDR issues for failover. This mechanism may also be used if storage control unit 310 requires the host to rebuild its locks for other reasons that result in partitions being marked as "global disconnect required."

When storage control unit 310 receives the PSF/DSO (perform subsystem facility/define subsystem order) basic connect order for the first user to an MPLF partition in a particular logical subsystem, as part of the connect process, in a multiple CEC storage control unit, the CEC with the active LSS containing the partition sends a cross-CEC message to the other CEC(s) in storage control unit 310. Storage control unit 310 uses this message to set a "reflected" active partition flag so it can keep track of active partitions on the other LSS in the event of failover and loss of the active partition structure. Then once the logical subsystems move to the other CEC(s), storage control unit 310 knows which partitions were active and can signal the host of their loss with the next MPLF related command to the LSS/partition. The memory of the CEC may keep track of this information on the CEC itself.

Although storage control unit 310 may have reflected information in CEC processor memory for the CEC's non-active logical subsystems, storage control unit 310 may store this information elsewhere. In one embodiment, storage control unit 310 may store the reflected information in host adapter memory (not shown). It would only be necessary to keep the information on the host adapter associated with the connection path because that is the only host adapter that could communicate with the associated CPU. In this embodiment, storage control unit 310 would only keep reflected information for each host adapter associated with a user. Thus, in the event of a failover, the surviving CEC would query the host adapters for reflected information.

In another embodiment, storage control unit 310 may keep the reflected partition information in metadata, allowing the surviving CEC(s) to query metadata after failover to determine the reflected information.

In an example storage control unit implementation, the storage control unit 310 stores control structures by LSS and partition. Within the partition control block are the individual lock tables and attention cells. For the purposes of understanding the overall concepts, these control structures are referred to as "lock control data" herein. As mentioned previously, when the host connects for the first time to a partition, its associated device/path for the command is stored and then associated with the particular host/user for the duration of the user's connection to the partition (or until it is reassigned via another command—Assume Ownership).

In accordance with the illustrative embodiments, the reflected information is enhanced to include sufficient information to raise the unsolicited status to include the connect device, the connect path (logical path number), and user token. Storage control unit 310 stores this information for 1 to N users depending on the embodiment. In one illustrative embodiment, to store the information for each user connected to a partition would require additional cross-CEC messages to pass the required additional information. There is a cross-CEC message when the partition goes from unused to used as well as a single message when the partition goes from used to unused during PSF disconnect processing.

As part of the failover processing, once I/O is allowed, storage control unit 310 checks the reflected information and presents unsolicited status, as needed. For each LSS that moved, storage control unit 310 determines whether there is a reflected partition. For each user associated with a reflected partition, storage control unit 310 requests global disconnect. Storage control unit 310 creates an attention message requesting global disconnect for the associated host and raises an unsolicited attention interrupt for the connection device/path.

Alternatively, the storage control unit 310 may select a single user to request global disconnect, because if all users respond to a global disconnect request then the storage control unit 310 would have many more global disconnects than necessary. Only one global disconnect is needed per partition. If the selected user does not respond in a timely fashion, storage control unit 310 selects the next user and tries again, until all users associated with the partition are exhausted. When a host, responds, storage control unit 310 offloads the associated attention message for the user.

FIG. 5 illustrates an unsolicited attention message requesting global disconnect in accordance with an illustrative embodiment. The attention message may be similar to the existing MPLF type attentions associated with "lock contention" and "lock granted" conditions, which are examples of attention messages providing status to host applications. In the example embodiments, the storage control unit 310 sends the unsolicited attention message to users. Hosts, such as users 302, 304, 306, 308 are enhanced to respond to this new attention message and perform the global disconnect and connect/lock rebuild operations when receiving this message. Thus, the hosts may receive the unsolicited status notifying the users that a global disconnect is required without polling.

With this new behavior, storage control unit 310 adds a new handshaking bit to the PRSD (prepare to read subsystem data) suborder base features supported (Read Feature Codes suborder 0x41). The new bit allows the host to understand when it can expect this unsolicited status and whether storage control unit 310 can support producing the new global disconnect request attention message.

By having storage control unit 310 "push" the global disconnect required information to the host operating system, the mechanism of the illustrative embodiments removes the need for the host polling mechanism discussed previously. A push mechanism reduces the processing and I/O loads on the host CPU. While this may not currently be a significant load due to the number of logical subsystems allowed, increases in LSS numbers with product changes and the use of virtualized logical subsystems will increase this load. In addition, there is additional communication on the channel and in the storage control unit that would not be necessary with the push mechanism of the illustrative embodiments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 6 is a flowchart illustrating operation of a storage control unit providing unsolicited global disconnect requests to software in accordance with an illustrative embodiment. Operation begins during failover processing. The storage control unit checks reflected information (block 602) and presents unsolicited status, as needed (block 604). Then, for each logical subsystem that moved (block 606), the storage control unit determines whether there is a reflected partition (block 608). If there is no reflected partition, then the storage control unit considers the next logical subsystem (block 610), and operation returns to block 606. If the storage control unit has considered the last logical subsystem in block 610, then operation ends.

If there is a reflected partition in block 608, then for each user associated with the reflected partition (block 612), the storage control unit creates an unsolicited attention interrupt for the associated host (block 614) and raises an unsolicited attention interrupt for the connection device/path (block 616). Then, the storage control unit offloads the associated attention message for the user to read the unsolicited status (block 618), considers the next user (block 620) and operation returns to block 612. If the storage control unit has considered the last user in block 620, then operation proceeds to block 610 to consider the next logical subsystem.

FIG. 7 is a flowchart illustrating operation of a storage control unit providing unsolicited global disconnect requests to software in accordance with an alternative embodiment. Operation begins during failover processing. The storage control unit checks reflected information (block 702) and presents unsolicited status, as needed (block 704). Then, for each logical subsystem that moved (block 706), the storage control unit determines whether there is a reflected partition (block 708). If there is no reflected partition, then the storage control unit considers the next logical subsystem (block 710), and operation returns to block 706. If the storage control unit has considered the last logical subsystem in block 710, then operation ends.

If there is a reflected partition in block 708, then the storage control unit selects a single user (block 712), creates an unsolicited attention interrupt for the associated host (block 714), and raises an unsolicited attention interrupt for the connection device/path (block 716). The storage control unit then determines whether the selected host responds within a predetermined time period (block 718). If the host does not respond within the predetermined time period, then operation returns to block 712 to select the next user. If the host responds within the predetermined time period in block 718, then the storage control unit offloads the associated attention message for the user to read the unsolicited status (block 720). Then, operation proceeds to block 710 to consider the next logical subsystem.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for providing unsolicited global disconnect requests to software. When a storage control unit fails over, the storage control unit scans through its list of reflected partition indicators for the logical storage systems that moved. If the storage control unit sees an indication that the partition had been active when the LSS was on the other CEC, the storage controller gives unsolicited status to the host via a multi-path lock facility attention interrupt. The host responds by performing a read message operation to the storage control unit to read the unsolicited status. The read message returns the new global disconnect required (GDR) message. The host responds to this new message by initiating a global disconnect and reconnect and lock rebuild operations. In addition to giving this unsolicited status on GDR issues for failover, if the storage control unit requires the host to rebuild its locks for other reasons that result in partitions being marked as global disconnect required, this mechanism may also be used for this purpose.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a storage control unit in a data processing system, for providing unsolicited global disconnect requests to users, the method comprising:

storing lock control data in the storage control unit, wherein the storage control unit allocates its resources into a plurality of clusters and wherein the lock control data contains knowledge about locks, logical subsystems, partitions, and users of the partitions;

responsive to a given user connecting to a given partition that is for a logical subsystem resident on a first cluster within the plurality of clusters, sending reflected partition information from the first cluster to a second cluster within the plurality of clusters, wherein the reflected partition information identifies one or more logical subsystems, partitions, and connected users; and responsive to the first cluster experiencing a failure condition, moving control data from one or more logical subsystems from the first cluster to the second cluster, storing the control data for the one or more logical subsystems in association with the second cluster, and for each logical subsystem that moved from the first logical subsystem to the second logical subsystem and that has reflected partition information, presenting unsolicited status to one or more users, wherein the unsolicited status comprises a global disconnect requested message and wherein at least one user within the one or more users reads the unsolicited status.

2. The method of claim 1, further comprising:
storing the reflected partition information in association with the second cluster.

3. The method of claim 2, wherein storing the reflected partition information in association with the second cluster comprises:

storing the reflected information in processor memory of the second cluster.

4. The method of claim 2, wherein storing the reflected partition information in association with the second cluster comprises:
storing the reflected information in host adapter memory of the storage control unit, wherein the second cluster queries the host adapters for reflected information.

5. The method of claim 1, wherein presenting unsolicited status to one or more users comprises:
creating an unsolicited attention interrupt for a respective host associated with each of the one or more users; and
offloading an attention message associated with the unsolicited status to the one or more users.

6. The method of claim 1, wherein presenting unsolicited status to one or more users comprises:
creating an unsolicited attention interrupt for a host associated with a first user within the one or more users; and
responsive to the first user responding to the unsolicited attention interrupt within a predetermined period of time, offloading an attention message associated with the unsolicited status to the first user.

7. The method of claim 1, wherein presenting unsolicited status to one or more users further comprises:
responsive to the first user not responding to the unsolicited attention interrupt within a predetermined period of time, creating an unsolicited attention interrupt for a host associated with a next user within the one or more users and responsive to the next user responding to the unsolicited attention interrupt within a predetermined period of time, offloading an attention message associated with the unsolicited status to the next user.

8. The method of claim 1, wherein the unsolicited status comprises a length, a message type, a reason code, and a reason code.

9. A computer program product comprising a computer readable storage medium having a computer readable program stored therein, wherein the computer readable program, when executed on a storage control unit, causes the storage control unit to:
store lock control data in the storage control unit, wherein the storage control unit allocates its resources into a plurality of clusters and wherein the lock control data contains knowledge about locks, logical subsystems, partitions, and users of the partitions;
responsive to a given user connecting to a given partition that is for a logical subsystem resident on a first cluster within the plurality of clusters, send reflected partition information from the first cluster to a second cluster within the plurality of clusters, wherein the reflected partition information identifies one or more logical subsystems, partitions, and connected users; and
responsive to the first cluster experiencing a failure condition, move control data from one or more logical subsystems from the first cluster to the second cluster, store the control data for the one or more logical subsystems in association with the second cluster, and for each logical subsystem that moved from the first logical subsystem to the second logical subsystem and that has reflected partition information, present unsolicited status to one or more users, wherein the unsolicited status comprises a global disconnect requested message and wherein at least one user within the one or more users reads the unsolicited status.

10. The computer program product of claim 9, wherein the computer readable program further causes the storage control unit to:
store the reflected partition information in association with the second cluster.

11. The computer program product of claim 9, wherein presenting unsolicited status to one or more users comprises:
creating an unsolicited attention interrupt for a respective host associated with each of the one or more users; and
offloading an attention message associated with the unsolicited status to the one or more users.

12. The computer program product of claim 9, wherein presenting unsolicited status to one or more users comprises:
creating an unsolicited attention interrupt for a host associated with a first user within the one or more users; and
responsive to the first user responding to the unsolicited attention interrupt within a predetermined period of time, offloading an attention message associated with the unsolicited status to the first user.

13. The computer program product of claim 9, wherein presenting unsolicited status to one or more users further comprises:
responsive to the first user not responding to the unsolicited attention interrupt within a predetermined period of time, creating an unsolicited attention interrupt for a host associated with a next user within the one or more users and responsive to the next user responding to the unsolicited attention interrupt within a predetermined period of time, offloading an attention message associated with the unsolicited status to the next user.

14. The computer program product of claim 9, wherein the unsolicited status comprises a length, a message type, a reason code, and a reason code.

15. The computer program product of claim 9, wherein the computer readable program is stored in a computer readable storage medium in a data processing system and wherein the computer readable program was downloaded over a network from a remote data processing system.

16. The computer program product of claim 9, wherein the computer readable program is stored in a computer readable storage medium in a server data processing system and wherein the computer readable program is downloaded over a network to a remote data processing system for use in a computer readable storage medium with the remote system.

17. A storage control unit, comprising:
a processor; and
a memory coupled to the processor, wherein the memory comprises instructions which, when executed by the processor, cause the processor to:
store lock control data in the storage control unit, wherein the storage control unit allocates its resources into a plurality of clusters and wherein the lock control data contains knowledge about locks, logical subsystems, partitions, and users of the partitions;
responsive to a given user connecting to a given partition that is for a logical subsystem resident on a first cluster within the plurality of clusters, send reflected partition information from the first cluster to a second cluster within the plurality of clusters, wherein the reflected partition information identifies one or more logical subsystems, partitions, and connected users; and
responsive to the first cluster experiencing a failure condition, move control data from one or more logical subsystems from the first cluster to the second cluster, store the control data for the one or more logical subsystems in association with the second cluster, and for each logical subsystem that moved from the first logical subsystem to the second logical subsystem and that has reflected partition information, present unsolicited status to one or more users, wherein the unsolicited status comprises a global disconnect requested message and wherein at least one user within the one or more users reads the unsolicited status.

18. The storage control unit of claim 17, wherein presenting unsolicited status to one or more users comprises:
   creating an unsolicited attention interrupt for a respective host associated with each of the one or more users; and
   offloading an attention message associated with the unsolicited status to the one or more users.

19. The storage control unit of claim 17, wherein presenting unsolicited status to one or more users comprises:
   creating an unsolicited attention interrupt for a host associated with a first user within the one or more users; and
   responsive to the first user responding to the unsolicited attention interrupt within a predetermined period of time, offloading an attention message associated with the unsolicited status to the first user.

20. The storage control unit of claim 17, wherein presenting unsolicited status to one or more users further comprises:
   responsive to the first user not responding to the unsolicited attention interrupt within a predetermined period of time, creating an unsolicited attention interrupt for a host associated with a next user within the one or more users and responsive to the next user responding to the unsolicited attention interrupt within a predetermined period of time, offloading an attention message associated with the unsolicited status to the next user.

* * * * *